United States Patent
Harada et al.

(10) Patent No.: US 11,178,666 B2
(45) Date of Patent: Nov. 16, 2021

(54) USER TERMINAL AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Jing Wang, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 93 days.

(21) Appl. No.: 16/608,689

(22) PCT Filed: Apr. 28, 2017

(86) PCT No.: PCT/JP2017/017023
§ 371 (c)(1),
(2) Date: Oct. 25, 2019

(87) PCT Pub. No.: WO2018/198342
PCT Pub. Date: Nov. 1, 2018

(65) Prior Publication Data
US 2020/0145981 A1    May 7, 2020

(51) Int. Cl.
*H04W 72/04*     (2009.01)
*H04L 5/00*      (2006.01)
*H04W 56/00*     (2009.01)

(52) U.S. Cl.
CPC .......... *H04W 72/048* (2013.01); *H04L 5/005* (2013.01); *H04W 56/001* (2013.01); *H04W 72/044* (2013.01)

(58) Field of Classification Search
CPC ..... H04L 5/005; H04L 5/0053; H04L 5/0048; H04L 5/0094; H04L 5/0035; H04L 5/0025; H04W 24/10; H04W 72/042; H04W 72/044; H04W 72/1226; H04W 72/0453; H04W 72/0406; H04W 72/046; H04W 72/048; H04W 48/10; H04W 56/001; H04B 17/309; H04B 17/382
See application file for complete search history.

(56) References Cited

U.S. PATENT DOCUMENTS

| | | | |
|---|---|---|---|
| 10,098,109 B2* | 10/2018 | Chen | H04L 1/0067 |
| 10,841,818 B2* | 11/2020 | Jung | H04L 5/0051 |
| 2016/0205692 A1* | 7/2016 | Zhang | H04W 48/12 370/329 |
| 2016/0352477 A1* | 12/2016 | Nishio | H04B 7/0626 |
| 2017/0245165 A1* | 8/2017 | Onggosanusi | H04W 24/08 |

(Continued)

OTHER PUBLICATIONS

Nam et al. U.S. Appl. No. 62/484,193, filed Apr. 11, 2017 (Year: 2017).*

(Continued)

*Primary Examiner* — Wutchung Chu
(74) *Attorney, Agent, or Firm* — Osha Bergman Watanabe & Burton LLP

(57) ABSTRACT

RRM measurement can be configured properly. According to one aspect of the present invention, a user terminal has a receiving section that receives common information that represents a parameter that is common among a plurality of space resources that are used to transmit a reference signal, and a control section that controls measurement of the reference signal, which is transmitted using one of the plurality of space resources, based on the common information.

3 Claims, 13 Drawing Sheets

(56) References Cited

U.S. PATENT DOCUMENTS

| | | | | |
|---|---|---|---|---|
| 2017/0311299 | A1* | 10/2017 | Chen | H04L 5/0048 |
| 2018/0262313 | A1* | 9/2018 | Nam | H04L 5/0044 |
| 2018/0278312 | A1* | 9/2018 | Frenne | H04L 1/0023 |
| 2018/0279145 | A1* | 9/2018 | Jung | H04W 24/08 |
| 2019/0230521 | A1* | 7/2019 | Tomeba | H04B 7/06 |
| 2019/0245603 | A1* | 8/2019 | Yum | H04B 7/0617 |
| 2019/0312668 | A1* | 10/2019 | Park | H04L 5/00 |
| 2020/0037260 | A1* | 1/2020 | Fu | H04L 27/2646 |
| 2020/0112355 | A1* | 4/2020 | Park | H04B 7/0626 |
| 2020/0212981 | A1* | 7/2020 | Guo | H04L 5/0053 |
| 2020/0288482 | A1* | 9/2020 | Yi | H04W 72/1289 |
| 2020/0304192 | A1* | 9/2020 | Yum | H04L 5/0094 |
| 2020/0304256 | A1* | 9/2020 | Park | H04L 5/0048 |

OTHER PUBLICATIONS

International Search Report issued in PCT/JP2017/017023 dated Jul. 25, 2017 (1 page).

Written Opinion of the International Searching Authority issued in PCT/JP2017/017023 dated Jul. 25, 2017 (4 pages).

NTT Docomo, Inc.; "Discussion on CSI-RS configuration for NR RRM measurement in Connected mode"; 3GPP TSG RAN WG1 Meeting #88bis, R1-1705713; Spokane, USA; Apr. 3-7, 2017 (6 pages).

NTT Docomo, Inc.; "Discussion and evaluation on NR-PBCH design"; 3GPP TSG RAN WG1 Meeting #88bis, R1-1705708; Spokane, USA; Apr. 3-7, 2017 (9 pages).

ZTE, ZTE Microelectronics.; "NR-PBCH Design"; 3GPP TSG RAN WG1 Meeting #88bis, R1-1704361; Spokane, USA; Apr. 3-7, 2017 (10 pages).

ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).

Office Action issued in the counterpart Japanese Patent Application No. 2019-515043, dated May 11, 2021 (6 pages).

Samsung; "Cell measurement with NR-SS and CSI-RS"; 3GPP TSG-RAN WG2 2017 RAN2#97bis Meeting, R2-1703724, Spokane, USA, Apr. 3-7, 2017 (5 pages).

* cited by examiner

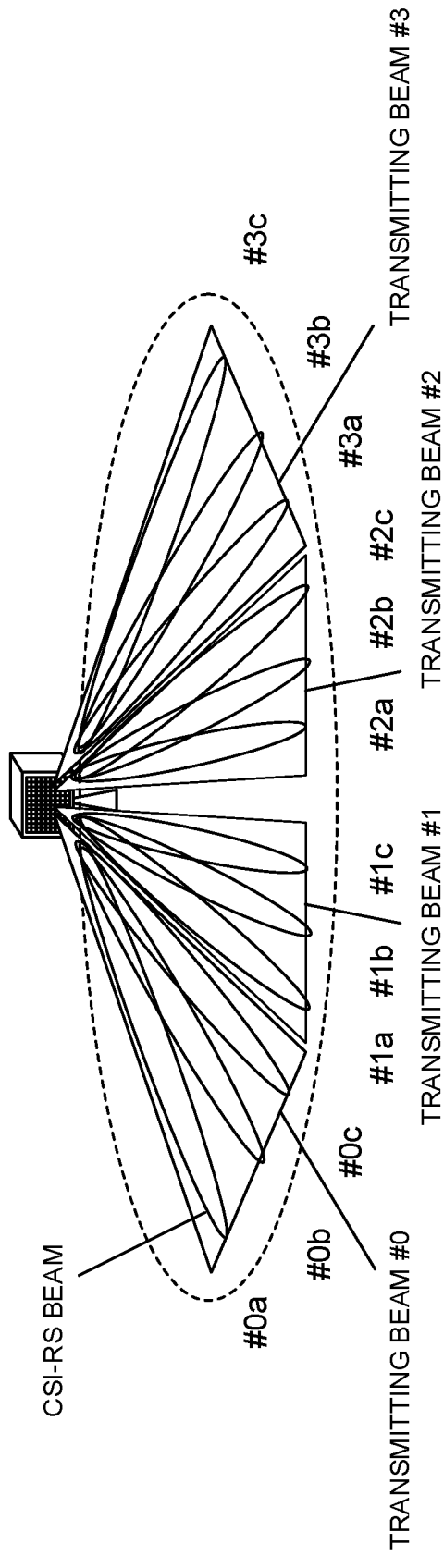

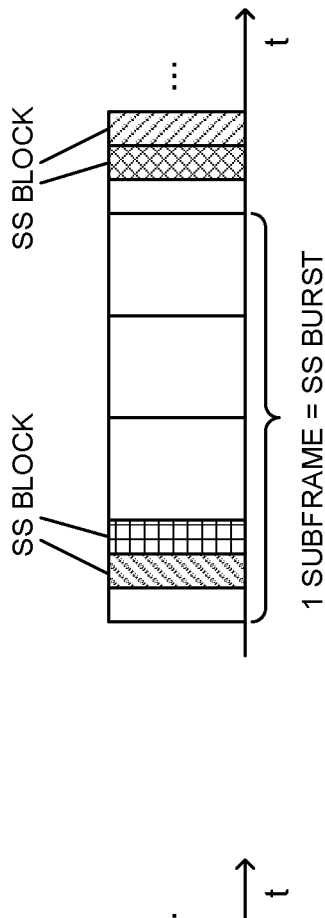

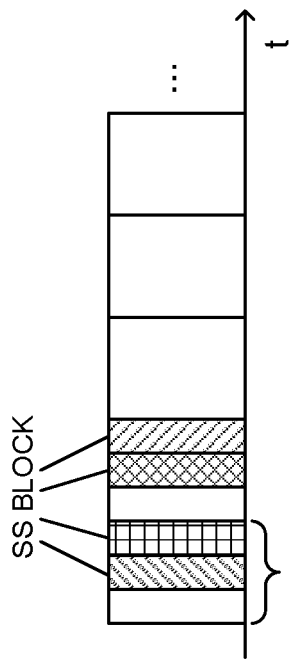

FIG. 4C (OPTION A-1a)

EACH SIB IN SS BURST X (TRANSMITTING BEAMS #0 AND #1)

CSI-RS CONFIGURATION OF CSI-RS BEAM #0a – SS BLOCK INDEX OF TRANSMITTING BEAM #0
CSI-RS CONFIGURATION OF CSI-RS BEAM #0b – SS BLOCK INDEX OF TRANSMITTING BEAM #0
⋮
CSI-RS CONFIGURATION OF CSI-RS BEAM #1c – SS BLOCK INDEX OF TRANSMITTING BEAM #1

EACH SIB IN SS BURST Y (TRANSMITTING BEAMS #2 AND #3)

CSI-RS CONFIGURATION OF CSI-RS BEAM #2a – SS BLOCK INDEX OF TRANSMITTING BEAM #2
CSI-RS CONFIGURATION OF CSI-RS BEAM #2b – SS BLOCK INDEX OF TRANSMITTING BEAM #2
⋮
CSI-RS CONFIGURATION OF CSI-RS BEAM #3c – SS BLOCK INDEX OF TRANSMITTING BEAM #3

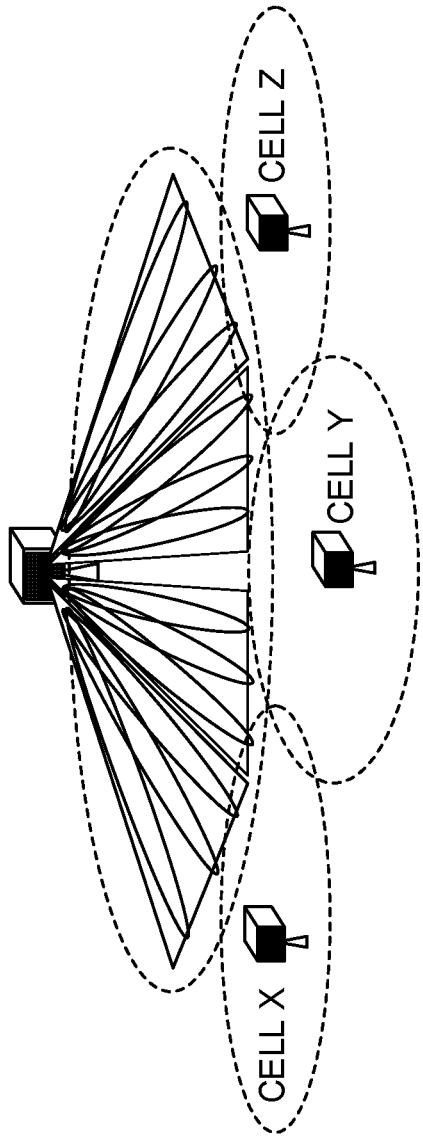

FIG. 5A

FIG. 5B (OPTION A-3) EACH SIB ON TRANSMITTING BEAMS #0, #1, #2, AND #3

CSI-RS CONFIGURATION OF CSI-RS BEAM X0a FOR CELL X – CELL ID OF CELL X – SS BLOCK INDEX OF TRANSMITTING BEAM X0 FOR CELL X
CSI-RS CONFIGURATION OF CSI-RS BEAM X0b FOR CELL X – CELL ID OF CELL X – SS BLOCK INDEX OF TRANSMITTING BEAM X0 FOR CELL X
⋮
CSI-RS CONFIGURATION OF CSI-RS BEAM Z0c FOR CELL Z – CELL ID OF CELL Z – SS BLOCK INDEX OF TRANSMITTING BEAM Z0 FOR CELL Z

FIG. 5C (OPTION A-4) SIB ON TRANSMITTING BEAM #1

CSI-RS CONFIGURATION OF CSI-RS BEAM X1a FOR CELL X – CELL ID OF CELL X – SS BLOCK INDEX OF TRANSMITTING BEAM X1 FOR CELL X
CSI-RS CONFIGURATION OF CSI-RS BEAM X1b FOR CELL X – CELL ID OF CELL X – SS BLOCK INDEX OF TRANSMITTING BEAM X1 FOR CELL X
⋮
CSI-RS CONFIGURATION OF CSI-RS BEAM Y2c FOR CELL Y – CELL ID OF CELL Y – SS BLOCK INDEX OF TRANSMITTING BEAM Y2 FOR CELL Y

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted to provide wide bands and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 13," "LTE Rel. 14," "LTE Rel. 15" or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as 1 unit. Furthermore, in CA, a number of CCs under the same radio base station (referred to as, for example, an "eNB (evolved Node B)," a "BS (Base Station)," and so on) are configured in a user terminal (UE (User Equipment)).

Meanwhile, in LTE Rel. 12, dual connectivity (DC), in which multiple cell groups (CGs) formed with different radio base stations are configured in UE, is also introduced. Each cell group is comprised of at least 1 cell (CC). Given that multiple CCs under different radio base stations are integrated in DC, DC is also referred to as "inter-eNB CA."

Also, in LTE Rel. 8 to 12, frequency division duplex (FDD), in which downlink (DL) transmission and uplink (UL) transmission take place in different frequency bands, and time division duplex (TDD), in which downlink transmission and uplink transmission switch over time and take place in the same frequency band, are introduced.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Future radio communication systems (for example, 5G, NR, etc.) are expected to realize various radio communication services so as to fulfill mutually varying requirements (for example, ultra high speed, large capacity, ultra-low latency, etc.).

For example, 5G/NR is under study to provide radio communication services, referred to as "eMBB (enhanced Mobile Broad Band)," "mMTC (massive Machine Type Communication)," "URLLC (Ultra Reliable and Low Latency Communications)," and so on.

Now, regarding NR, research is underway to make use of RRM (Radio Resource Management) measurement for mobility control. However, how to configure RRM measurement has not yet been decided yet. Unless RRM measurement is conducted properly, communication throughput may be degraded.

The present invention has been made in view of the above, and it is therefore an object of the present invention to provide a user terminal and a radio communication method, whereby RRM measurement can be configured properly.

Solution to Problem

According to one aspect of the present invention, a user terminal has a receiving section that receives common information that represents a parameter that is common among a plurality of space resources that are used to transmit a reference signal, and a control section that controls measurement of the reference signal, which is transmitted using one of the plurality of space resources, based on the common information.

Advantageous Effects of Invention

According to the present invention, RRM measurement can be configured properly.

BRIEF DESCRIPTION OF DRAWINGS

FIGS. 3A to 3C are diagrams to show examples of RRM measurements for a serving cell;

FIGS. 4A to 4C are diagrams to show examples of option A-1a;

FIGS. 5A to 5C are diagrams to show examples of RRM measurements for nearby cells;

DESCRIPTION OF EMBODIMENTS

Figure 1:
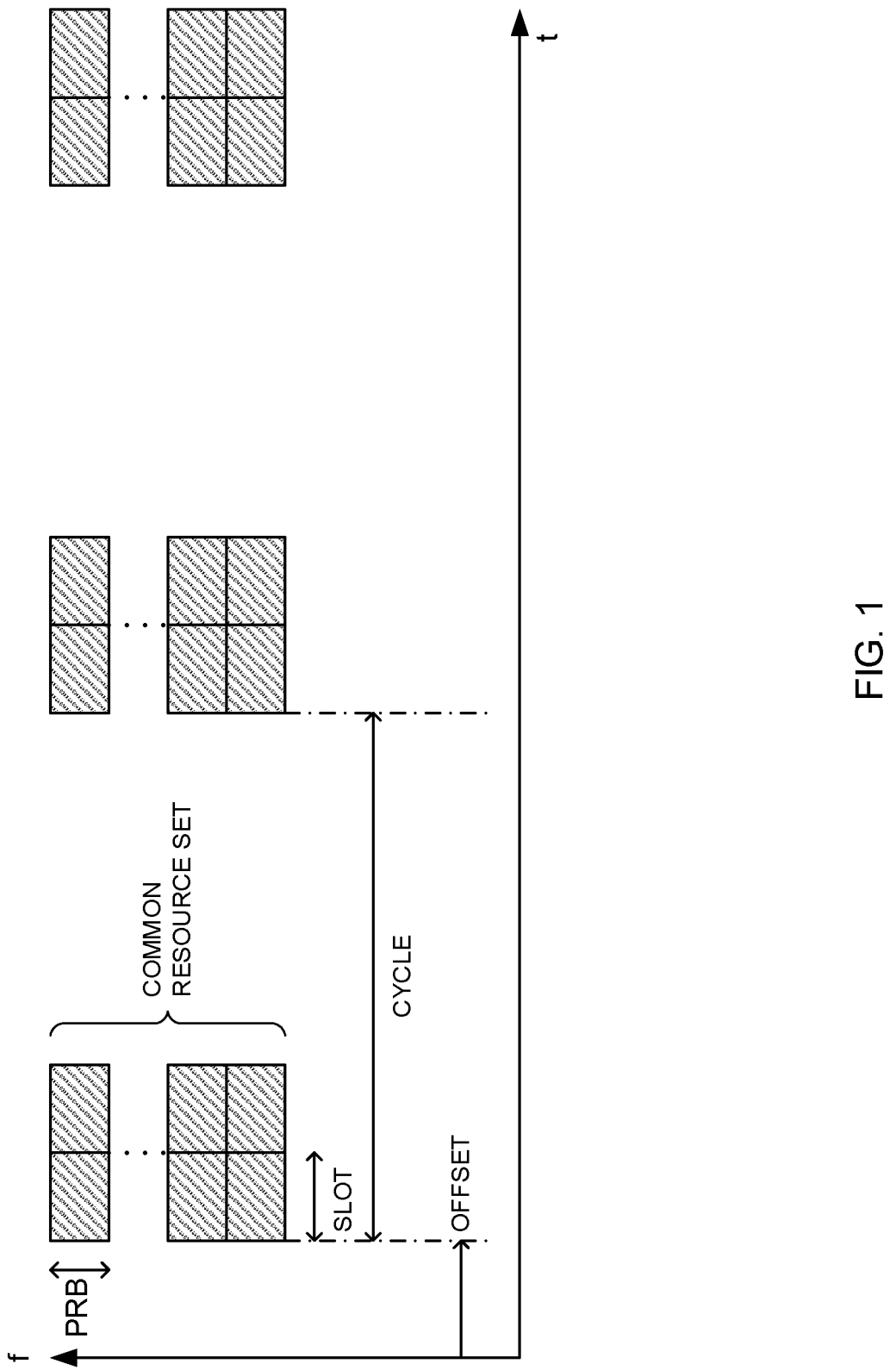
FIG. 1 is a diagram to show an example of a common resource set.

First, an example of mobility control in LTE will be described. In LTE Rel. 11, coordinated multi-point transmission/reception (CoMP) technology is standardized to enable dynamic point selection (DPS), in which UE performs measurements and reporting based on channel state information reference signals (CSI-RSs), with respect to multiple transmission/reception points (TRPs), and switches the communicating TRP on a dynamic basis.

Note that a TRP is, for example, a base station, and may be simply referred to as a "transmission point (TP)," a "reception point (RP)," and/or the like.

In one example of DPS procedures, UE first detects a cell based on synchronization signals (PSS (Primary Synchronization Signal)/SSS (Secondary Synchronization Signal)) and cell-specific reference signals (CRSs), and performs RRM (Radio Resource Management) measurement/reporting.

In RRM measurement/reporting, the UE may, for example, measure received power (for example, RSRP (Reference Signal Received Power)), and report information related to the received power. Note that "measurement/reporting" as used herein may be used interchangeably with "measurement and/or reporting."

Multiple CSI processes (up to 4 processes) for performing CSI measurement for each TRP are configured from the connecting cell to the UE. The UE measures/reports the CSI-RSs transmitted from each TRP, based on the configurations of CSI processes, and the network switches, dynamically, the TRP to use for transmission and reception with the UE, based on the results reported (DPS).

In the CSI measurement report, the UE may report CSI pertaining to at least one of a channel quality indicator (CQI), a precoding matrix indicator (PMI), a precoding-type indicator (PTI), a rank indicator (RI) and so on.

The network may find out the TRP with the highest received quality of signals in the UE, based on the measurement results reported from the UE, and use this TRP for transmission/reception with the UE.

In this way, by using multiple CSI processes, even when the UE moves within the same cell, communication with the network can be maintained by switching the TRP the UE communicates with, without switching the cell or reconfiguring the RRC (Radio Resource Control) information. Managing (maintaining) communication during movement not recognized by higher layers is also referred to as "layer 1/layer 2 mobility (L1/L2 mobility)."

Note that, when movement to cross cells occurs (for example, handover across cells), it is necessary to switch the connecting cell and reconfigure the RRC information because L1/L2 mobility cannot be maintained. Managing (maintaining) communication during movement recognized by higher layers is also referred to as "layer 3 mobility (L3 mobility)."

For mobility measurement in NR DL, studies are underway to support idle RS-based RRM measurement, in which an idle RS that is always "on" is used, in both idle mode and connected mode.

This idle RS may be, for example, the NR-SSS, or the NR-SSS and the DMRS (DeModulation Reference Signal) for the PBCH (Physical Broadcast Channel).

Also, for mobility measurement, studies are underway to support CSI-RS-based RRM measurement to use CSI-RS, only in connected mode. Other reference signals such as MRS (Mobility Reference Signal) and DMRS may be used, instead of CSI-RS.

In CSI-RS-based RRM measurement, the presence of nearby cells and the cell IDs are detected based on NR-SSs (Synchronization Signals). Higher layer signaling from the NW (network, including, for example, a radio base station) configures idle RS-based RRM measurement and/or CSI-RS-based RRM measurement in UE (User Equipment) in connected mode.

Use cases of CSI-RS-based RRM measurement that are under research include, for example, the following:

Improving the accuracy of measurements by cell-edge UEs by using CSI-RSs;

Similar to CoMP scenario 4, allowing UE to identify beams and/or TRPs (Transmission Reception Points) that use common PSS/SSS by using CSI-RSs;

Using CSI-RSs when the beam width of an NR-SS is very wide, and the granularity of the beam is not sufficient for later beam-level RSRP (Reference Signal Received Power) measurement for L1/L2 mobility;

Using wide-beam NR-SSs for high-mobility UEs and narrower-beam CSI-RSs for low-mobility UEs; and Measuring carriers that do not use initial access (for example, non-stand-alone carriers), by using CSI-RSs.

In LTE, RSRP measurement to use CSI-RSs has been supported since Rel. 12. This RSRP measurement requires explicit configuration information for each CSI-RS resource (up to 96 CSI-RS resources). For example, for every CSI-RS resource, a cell ID (PCID (Physical Cell Identifier)), a scrambling ID, a CSI-RS configuration index to show the resource for the CSI-RS, a subframe offset, and a CSI-RS-specific offset need to be indicated, in addition to a cycle and a time offset (DMTC (Discovery Measurement Timing Configuration)). If explicit signaling of configurations as in LTE is applied to CSI-RS-based RRM measurement, the configuration information becomes very large.

Envisaging NR, studies are in progress to provide CSI-RS configurations that support measurements of multiple beams, and to reduce the overhead of setup, the overhead of reporting measurement results and the burden of UEs. Also, at least individual RRC signaling is planned to be supported for CSI-RS configurations.

If individual RRC signaling alone is supported, since all measurement-target CSI-RS configurations of serving and nearby cells are signaled for each individual UE, so that the overhead of signaling CSI-RS configurations will increase.

So, the present inventors have worked on a method for realizing CSI-RS-based RRM measurements while reducing the overhead of setup and/or reporting.

To be more specific, NR supports common resource configuration information that shows common configurations for multiple CSI-RSs for CSI-RS-based RRM measurements. Common resource configuration information includes at least one of the parameters that represent information about a common resource set (for example, a time/frequency resource pool), which is a set of resources that are available for use in RRM measurements, the cycle of the common resource set, the time offset of the common resource set, and the antenna port planned. A time/frequency resource pool shows multiple time and frequency resources for CSI-RSs. A time/frequency resource pool may be referred to as a "pattern of time and frequency resources." Antenna ports may be associated with orthogonal codes for code division multiplexing (CDM).

A common resource set may include CSI-RS resource configurations for CSI-RS resources, per predetermined time length and per predetermined bandwidth. For example, as shown in FIG. 1, a common resource set may be configured so that a CSI-RS resource configuration, comprised of a 1-slot and 1-PRB unit, repeats over multiple slots and/or multiple PRBs. In this case, information about the common resource set may be provided so as to show every how many slots the CSI-RS resource configuration is repeated, and/or every how many PRBs the CSI-RS resource configuration is repeated. As described above, by repeating a CSI-RS resource configuration, it is possible to improve the accuracy of measurements, while reducing the overhead of setup.

Furthermore, a common resource set is allocated in accordance with the cycle and time offset. The cycle and time offset are configured in common for CSI-RSs in the common resource set, so that the overhead of setup can be reduced compared to the method of configuring cycles and time offsets on a per CSI-RS basis.

Figure 2:
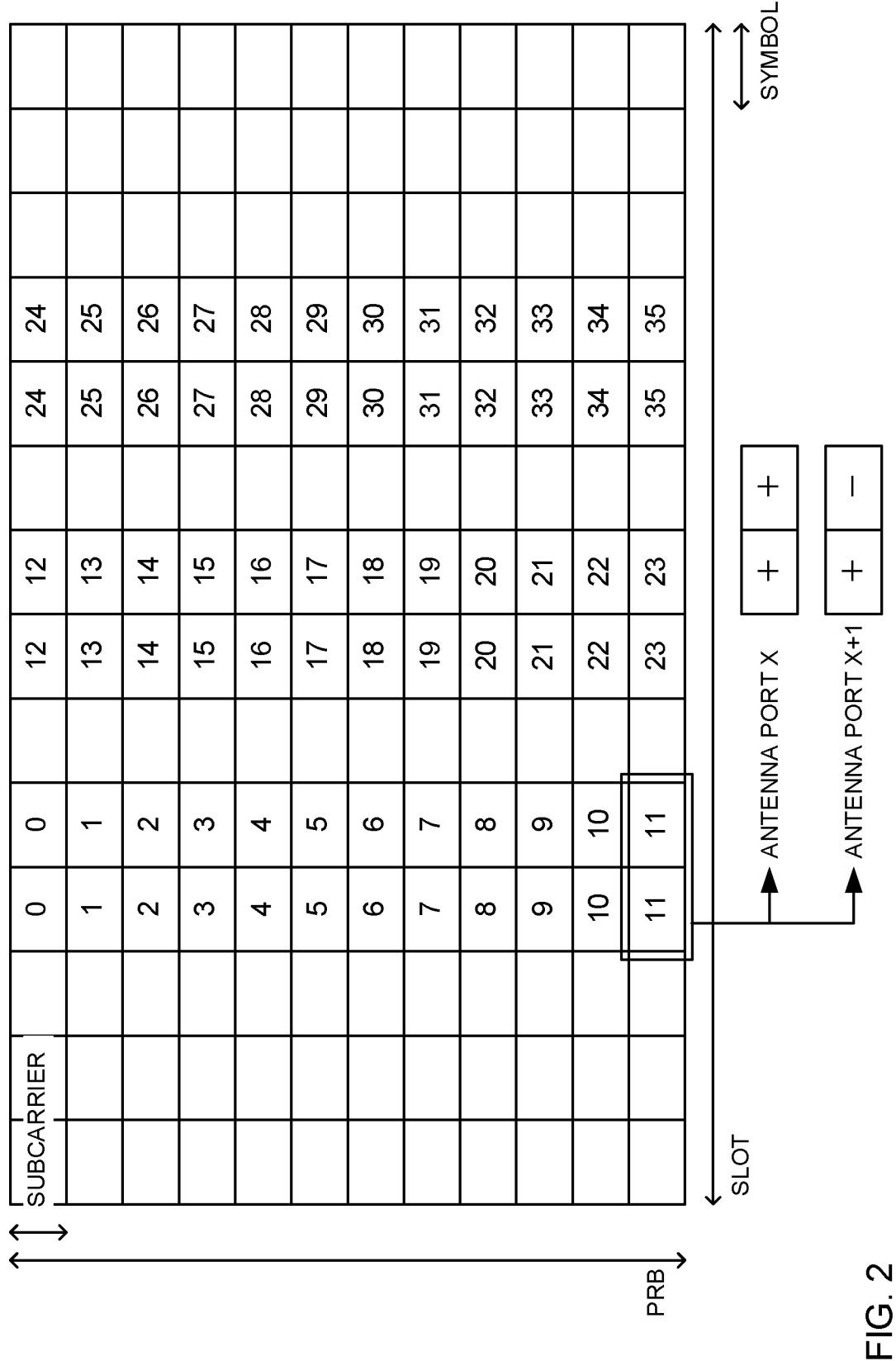
FIG. 2 is a diagram to show an example of CSI-RS resource configuration.

A CSI-RS resource configuration shows CSI-RS resources in units of predetermined time length and predetermined bandwidth. For example, as shown in FIG. 2, a CSI-RS resource configuration refers to resources for multiple CSI-RS s in a 1-slot and 1-PRB unit. Each CSI-RS resource may include time/frequency resource information and antenna port information.

In this example, the CSI-RS resource configuration includes information about 36 time/frequency resources, and 2 antenna ports. In this example, the time/frequency resources for each CSI-RS are comprised of 2 symbols and 1 subcarrier. In each time/frequency resource, 2 CSI-RSs that are transmitted using 2 respective antenna ports are code-division-multiplexed by using an orthogonal code (for example, OCC (Orthogonal Cover Code) that spans 2 symbols (sequence length 2)).

The CSI-RS resource configuration may show the locations of each CSI-RS's time/frequency resources in the time domain and the frequency domain. The locations in the time domain and the locations in the frequency domain may be represented by symbol indices and subcarrier indices, respectively. The CSI-RS resource configuration may include CSI-RS configuration indices (#0 to #35) for identifying the time/frequency resources of each CSI-RS.

The CSI-RS resource configuration may include antenna port indices (X and X+1) for identifying the antenna port of each CSI-RS.

Besides common resource configuration information, resource configuration information for each beam may be configured in UE. For example, resource configuration information may include at least one of, information to show the combinations of the indices of resources in a common resource set and their indicators (CSI-RS-IDs), scrambling IDs, and antenna port indices.

The common resource configuration information may be common in frequency band units (for example, in carrier units), may be common in cell units, or may be common in beam-/TRP-group units. A beam/TRP group may be a group comprised of part of the beams and/or TRP in a cell, or may be a group of multiple beams and/or TRPs across cells.

UE reports the top N measurement results (for example, RSRPs) of detected CSI-RS resources, and information associated with those CSI-RS resources (for example, at least one of CSI-RS resource configuration indices, cell IDs (scrambling IDs) and antenna port indices).

In this way, the amount of information for setup can be reduced by making part of the information required for CSI-RS-based RRM measurements common among multiple UEs.

However, the details of signaling of common resource configuration information (common signaling involving, for example, SIBs (System Information Blocks)) are not decided yet. Also, common signaling for serving cells and nearby cell is not defined yet.

So, the present inventors have come up with the idea of allowing a NW (which stands for "network," typified by, for example, a radio base station) to transmit SIBs that show common resource configuration information, which applies in common to a number of CSI-RS beams that are used to transmit CSI-RSs, and allowing UE to control measurements of CSI-RSs that are transmitted using any of the CSI-RS beams based on SIBs.

Multiple CSI-RS beams may be switched (swept). A number of CSI-RS beams are associated with CSI-RS configurations, respectively. The CSI-RSs in each CSI-RS configuration are transmitted using corresponding CSI-RS beams.

To be more specific, common signaling for reporting common resource configuration information is defined. The following options may be available for the serving cell and nearby cells.

Option A: Using different common signalings (for example, different SIBs) to tell CSI-RS configurations to the serving cell and nearby cells.

Option B: Using 1 common signaling (for example, a certain SIB) to tell CSI-RS configurations to the serving cell and nearby cells.

Option C: Using 1 common signaling (for example, a certain SIB) to tell CSI-RS configurations to the serving cell. To nearby cells, CSI-RS configurations are reported using UE-specific RRC signaling.

Instead of SIBs, common higher layer signaling that is common between UEs, such as different broadcast information, may be used. Other UE-specific higher layer signaling may be used, instead of RRC signaling.

Also, there may be the following options for common signaling in multi-beam scenarios.

Option 1: UE-common signaling: For example, SIBs on different transmitting beams in beam sweeping carry common contents. An SIB communicates CSI-RS configurations and the association between CSI-RS configurations and SS blocks (indices). Note that option 1 includes options A-1, A-1a, A-3 and A-3a, which will be described later.

An SS block is a resource (or a resource set) that contains at least one of NR-PSS, NR-SSS, and PBCH. For example, UE may assume that an NR-PSS, an NR-SSS and a PBCH, when received in an SS block corresponding to the same SS block index (time index corresponding to the SS block), have been transmitted in the same transmitting beam. The UE can detect an SS block index from a signal in the SS block.

SS blocks are transmitted using corresponding transmitting beams. SIBs are transmitted using each of a number of transmitting beams. The width of a transmitting beam may be wider than the width of a CSI-RS beam. For example, the area covered by a transmitting beam may overlap with the area covered by multiple CSI-RS beams. Transmitting beams may be referred to as "space resources for synchronization."

Option 2: UE group-common (beam-specific) signaling: For example, different transmitting beams in beam sweeping carries different contents. SIBs communicate CSI-RS configurations that are associated with transmitting beams that are used to transmit the SIBs. Note that option 2 corresponds to options A-2 and A-4, which will be described later.

In this way, SIBs to show common resource configuration information, which applies in common to multiple CSI-RS beams that are used to transmit CSI-RSs, are transmitted, so that the overhead of signaling CSI-RS configurations is reduced. Also, UE controls measurements of CSI-RSs, which are transmitted using any of a number of CSI-RS beams, based on SIBs, so that the UE can measure CSI-RSs properly, and reduce the burden of the UE.

Note that a "beam" as used herein may be interpreted as meaning a "resource," a "space resource," an "antenna port" and the like.

Now, embodiments of the present invention will be described in detail below with reference to the accompanying drawings. Note that the radio communication methods according to the herein-contained embodiments may be used individually or may be used in combination.

RADIO COMMUNICATION METHOD

First Embodiment

In the first embodiment of the present invention, different common signalings (for example, different SIBs) are used to communicate CSI-RS configurations to the serving and nearby cells (option A).

«Common Signaling for CSI-RS Configurations for the Serving Cell»For common signaling (for example, SIBs) for CSI-RS configurations for the serving cell, there may be the following options of A-1, A-1a and A-2.

Option A-1: Each SIB on different transmitting beams communicates all the CSI-RS configurations for the serving cell and the association between CSI-RS configurations and SS blocks (indices). That is, SIBs transmitted using all the transmitting beams in the serving cell carry common contents. UE can acquire all of the CSI-RS configurations for the serving cell by reading 1 SIB. Also, the UE selects the CSI-RSs associated with an SS block index that is detected, and measures the selected CSI-RSs.

According to option A-1, the UE may select CSI-RS configurations that might be received, from 1 SIB. Consequently, it is possible to avoid reporting CSI-RS configurations on a per UE basis, so that the overhead of reporting CSI-RS configurations can be reduced.

Option A-1a: Each SIB on different transmitting beams communicates a number of CSI-RS configurations for the serving cell and the association between CSI-RS configurations and SS blocks (indices). These CSI-RS configurations are associated with a certain unit (for example, an SS burst). UE can acquire CSI-RS configurations that correspond to an SS burst for the serving cell by reading 1 SIB. Also, the UE selects the CSI-RSs that are associated with SS block indices detected in the SS burst, and measures the selected CSI-RSs.

According to option A-1a, CSI-RS configurations are associated with a group of transmitting beams (SS burst) and transmitted, so that the amount of information of SIBs can be reduced compared to option A-1.

An SS burst is a unit time resource comprised of a number of SS blocks, and may be a slot or a subframe. 1 SS block is associated with 1 transmitting beam, and 1 SS burst is associated with a set of multiple transmitting beams. Consequently, the SIBs in each set carry common contents. When the UE moves from a location in 1 set to a location in another set, the UE rereads the SIBs.

Option A-2: Each SIB on different transmitting beams communicates corresponding CSI-RS configurations for the serving cell. That is, the contents of SIB vary for each corresponding transmitting beam. UE can acquire corresponding CSI-RS configurations for the serving cell by reading 1 SIB. Also, the UE may read multiple SIBs and acquire more CSI-RS configurations (which are associated with different transmitting beams for SS blocks and/or SIBs).

According to option A-2, the CSI-RS configurations of CSI-RS beams associated with a transmitting beam are transmitted, so that the amount of information of SIBs can be reduced compared to options A-1 and A-1a.

Also, the UE may read multiple SIBs when triggered by configured events (for example, A2 to A6) or by individual signaling (based on UE measurement reporting). This allows the NW to control the timing for configuring the contents of SIBs in the UE.

Next, specific examples of RRM measurements for the serving cell will be described.

FIG. 3A is a diagram to show an example of a scenario of CSI-RS measurement for the serving cell. Within the serving cell, a wide range of transmitting beams (#0, #1, #2 and #3) for transmitting SS blocks and SIBs are swept. In this example, the number of transmitting beams is 4. CSI-RS beams (#0a, #0b, #0c, #3a, #3b and #3c), which are for transmitting CSI-RSs and which are narrower than the transmitting beams are swept. The number of CSI-RS beams in this example is 12. Each transmitting beam (for example, #0) is associated with 3 CSI-RS beams (for example, #0a, #0b and #0c). For example, CSI-RS beams that can be received in a given area are associated with a transmitting beam that can be received in that area. In this example, the area in which any of CSI-RS beams #0a, #0b and #0c can be received overlaps with the area in which transmitting beam #0 can be received.

FIG. 3B is a diagram to show examples of contents of SIBs in option A-1. In option A-1, all of the transmitting beams transmit the same SIB. This SIB includes the CSI-RS configurations that use each CSI-RS beam, and the indices of SS blocks that use the transmitting beams associated with these CSI-RS beams.

FIG. 3C is a diagram to show examples of contents of SIBs in option A-2. In option A-2, different transmitting beams transmit different SIBs. Each SIB includes the CSI-RS configurations that use corresponding CSI-RS beams.

In option A-1a, multiple SS blocks in an SS burst are transmitted using multiple transmitting beams, respectively.

FIG. 4A is a diagram to show an example of an SS burst. An SS burst, in this drawing, is 1 slot. That is, 1 slot is comprised of a number of SS blocks.

FIG. 4B is a diagram to show another example of an SS burst. An SS burst, in this drawing, is 1 subframe comprised of a number of slots. That is, 1 subframe is comprised of a number of SS blocks. This drawing shows an example in which the first slot in 1 subframe includes a number of SS blocks, and the other slots include no SS blocks. Slots to contain multiple SS blocks are subject to beam sweeping, and therefore have difficulty transmitting data. By transmitting data in slots containing no SS blocks, the efficiency of data transmission can be enhanced. Note that multiple SS blocks may be allocated across multiple slots in 1 subframe.

FIG. 4C is a diagram to show contents of SIBs in option A-1a. Here, an SS burst X includes SS blocks to use transmitting beam #0 and SS blocks to use transmitting beam #1. An SS burst Y includes SS blocks to use transmitting beam #2 and SS blocks to use transmitting beam #3. The SIBs to use transmitting beams #0 and #1 corresponding to SS burst X include CSI-RS configurations that use each CSI-RS beam associated with transmitting beams #0 and #1, and the indices of SS blocks that use the transmitting beams associated with these CSI-RS beams. The SIBs to use transmitting beams #2 and #3 corresponding to SS burst Y include CSI-RS configurations that use each CSI-RS beam associated with transmitting beams #2 and #3, and the indices of SS blocks that use the transmitting beams associated with these CSI-RS beams.

In the event the above-described common signaling for CSI-RS configurations for the serving cell is used, UE receives an SS block that is transmitted using one of a number of transmitting beams associated with a number of CSI-RS beams, a SIB to include common resource configuration information is transmitted using at least one of a number of transmitting beams, and the UE controls the measurement of the CSI-RS transmitted using the CSI-RS beam associated with the transmitting beam corresponding to the received SS block. By this means, in common resource configuration, the UE can select and measure CSI-RSs that can be received at the location of the UE.

«Common signaling for CSI-RS configurations for nearby cells» For common signaling (for example, SIBs) for CSI-RS configurations for nearby cells, there may be the following options of A-3, A-3a and A-4.

Option A-3: Each SIB on different transmitting beams of the serving cell communicates all the CSI-RS configurations for nearby cells and the association between CSI-RS configurations and SS blocks (indices). SIBs transmitted using all the transmitting beams in the serving cell carry common contents. For example, CSI-RS configurations that use CSI-RS beams of nearby cells that can be received in a given area are associated with SS blocks that use transmitting beams of nearby cell that can be received in that area.

By this means, the UE may receive all the CSI-RS configurations of nearby cells, and, from these, select CSI-RS configurations that may be received. Consequently, it is possible to avoid reporting CSI-RS configurations on a per UE basis, so that the overhead of reporting CSI-RS configurations can be reduced.

Instead of SS block indices of nearby cells, the SS block indices in the serving cell corresponding to the transmitting beam used for an SIB may be used. For example, CSI-RS configurations that use CSI-RS beams of nearby cells that can be received in a given area are associated with SS blocks that use transmitting beams of the serving cell that can be received in that area.

Also, the cell IDs of nearby cells may be associated with CSI-RS configurations that use these nearby cells' CSI-RS beams.

UE can acquire all of the CSI-RS configurations for nearby cells by reading 1 SIB. Also, the UE selects the CSI-RSs associated with an SS block index that is detected, and measures the selected CSI-RSs. According to option A-3, the UE can select CSI-RS configurations that might be received, from 1 SIB. Consequently, it is possible to avoid reporting CSI-RS configurations on a per UE basis, so that the overhead of reporting CSI-RS configurations can be reduced.

Option A-3a Each SIB on different transmitting beams communicates a number of CSI-RS configurations for nearby cells and the association between CSI-RS configurations and SS blocks (indices) for nearby cells. Different SIBs in a given unit (for example, an SS burst) carry common contents. Instead of SS block indices of nearby cells, the SS block indices in the serving cell corresponding to the transmitting beam used for an SIB may be used. Also, the cell IDs of nearby cells may be associated with CSI-RS configurations that use the nearby cells' CSI-RS beams.

UE can acquire CSI-RS configurations that correspond to an SS burst for nearby cells by reading 1 SIB. Also, the UE selects the CSI-RSs that are associated with SS block indices detected in the SS burst, and measures the selected CSI-RSs.

According to option A-3a, CSI-RS configurations are associated with a group of transmitting beams (SS burst) and transmitted, so that the amount of information of 1 SIB can be reduced compared to option A-3.

Option A-4: Each SIB on different transmitting beams communicates corresponding CSI-RS configurations for nearby cells. Instead of SS block indices of nearby cells, the SS block indices in the serving cell corresponding to the transmitting beam used for an SIB may be used. Also, the cell IDs of nearby cells may be associated with CSI-RS configurations that use the nearby cells' CSI-RS beams.

UE can acquire corresponding CSI-RS configurations for nearby cells by reading 1 SIB. Also, the UE may read multiple SIBs and acquire more CSI-RS configurations.

According to option A-4, the CSI-RS configurations of CSI-RS beams associated with a transmitting beam are transmitted, so that the amount of information of SIBs can be reduced compared to options A-3 and A-3a.

Next, specific examples of RRM measurements for nearby cells will be described.

FIG. 5A is a diagram to show an example of a scenario of CSI-RS measurement for nearby cells. As in FIG. 3A, transmitting beams #0, #1, #2, and #3 are transmitted in the serving cell, and CSI-RS beams #0a, #0b, #0c, . . . , #3a, #3b and #3c are transmitted. Also, cells X, Y and Z are nearby cells. Cell X sweeps transmitting beams X0, X1, X2, . . . and sweeps CSI-RS beams X0a, X0b, X0c, . . . . Cell Y sweeps transmitting beams Y0, Y1, Y2, . . . , and sweeps CSI-RS beams Y0a, Y0b, Y0c, . . . . Cell Z sweeps transmitting beams Z0, Z1, Z2, . . . , and sweeps CSI-RS beams Z0a, Z0b, Z0c, . . . .

FIG. 5B is a diagram to show examples of contents of SIB s in option A-3. In option A-3, all of transmitting beams #0 to #3 transmit the same SIB. This SIB includes CSI-RS configurations that use each CSI-RS beam of nearby cells, the cell IDs of the nearby cells, and the indices of SS blocks that use the transmitting beams associated with these CSI-RS beams in the nearby cells.

FIG. 5C is a diagram to show examples of contents of SIBs in option A-4. In option A-4, different transmitting beams transmit different SIBs. Each SIB includes CSI-RS configurations that use each CSI-RS beam of nearby cells, the cell IDs of these nearby cells, and the indices of SS blocks that use the transmitting beams associated with these CSI-RS beams in the nearby cells.

In option A-3a, for CSI-RS configurations for nearby cells, SIBs that use transmitting beams corresponding to 1 SS burst of the serving cell carry common contents. For example, if 2 SS blocks in an SS burst are transmitted using transmitting beams #0 and #1, respectively, the contents of SIBs for CSI-RS configurations of nearby cells are common between transmitting beams #0 and #1. Even though the number of transmitting beams and CSI-RS beams in nearby cells and the sweeping pattern of these beams are different from those of the serving cell, SIBs transmitted using transmitting beams #0 and #1 can communicate the CSI-RS configuration for the nearby cells that are to be measured, and the cell IDs and SS block indices for the nearby cells associated therewith.

CSI-RS configurations for nearby cells may be mapped to the serving cell's SIBs so that nearby cells' CSI-RS configurations communicated in SIBs may be monitored by UEs in the area of the SIBs. This mapping method is also applicable to options A-3 and A-4.

In options A-3, A-3a and A-4, instead of cell IDs of nearby cells and SS block indices of nearby cells, SS block indices of the serving cell may be associated with CSI-RS configurations for nearby cells. In this case, UE does not have to read SS block indices from the transmitting beams of nearby cells. Also, the UE can measure CSI-RSs corresponding to appropriate CSI-RS beams in the area where transmitting beams can be received.

That is, according to option A-3, each SIB may show the association between CSI-RS configurations for nearby cells and SS block indices for the serving cell.

Also, with option A-3a, an SIB that is transmitted using a transmitting beam associated with a given SS burst of the serving cell may show the association between CSI-RS configurations associated with the transmitting beam in nearby cells, and the indices of SS blocks that are transmitted using that transmitting beam in the serving cell.

Figure 6:
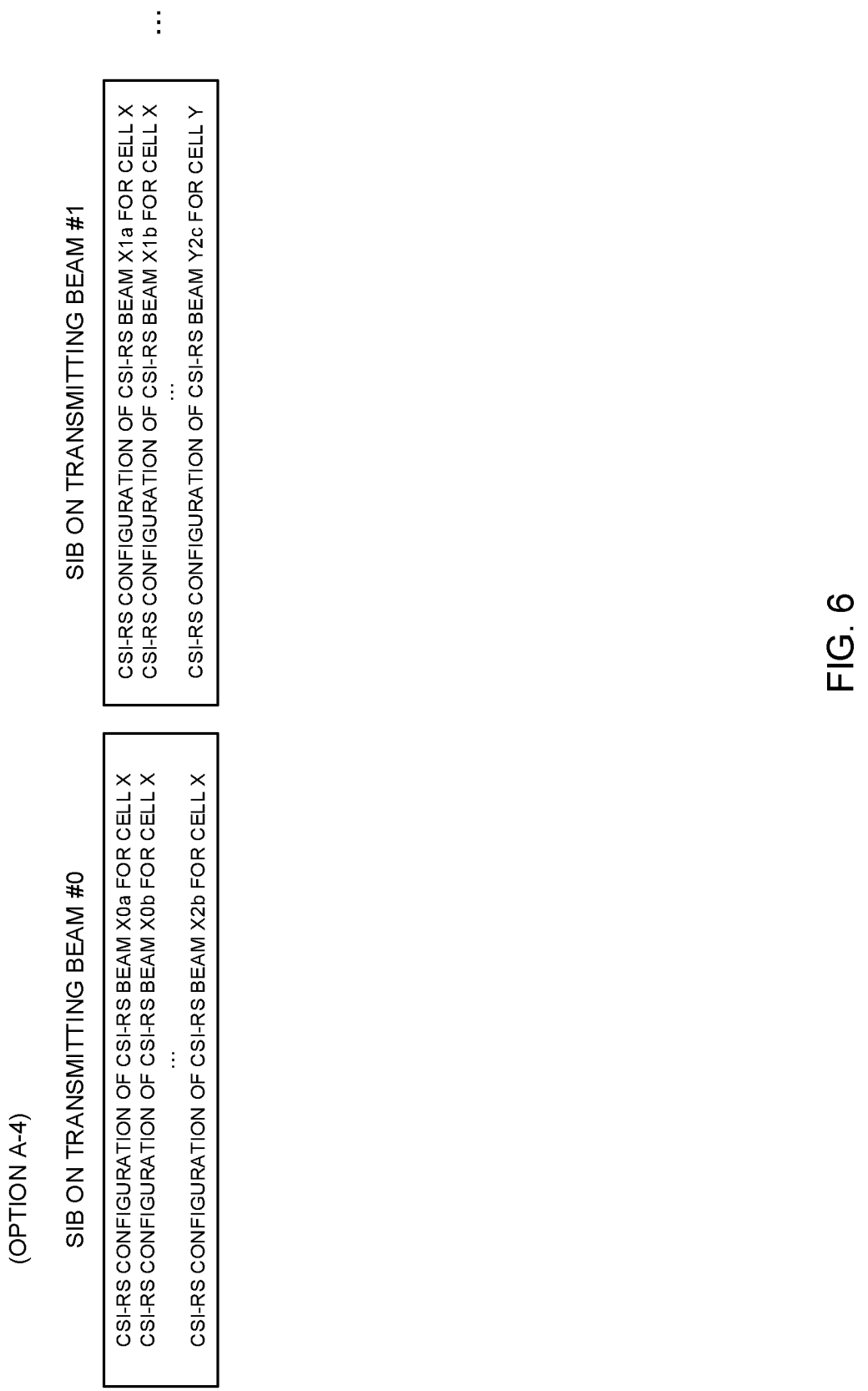
FIG. 6 is a diagram to show other examples of contents of SIBs in option A-4.

FIG. 6 is a diagram to show other examples of contents of SIBs in option A-4. According to option A-4, an SIB that is transmitted using a certain transmitting beam of the serving cell may show the CSI-RS configurations associated with that transmitting beam, among nearby cells' CSI-RS configurations. This SIB may not include the serving cell's SS block indices. For example, an SIB that is transmitted using transmitting beam #0 of the serving cell includes the CSI-RS configuration of the CSI-RS beam for nearby cell X, which is associated with that transmitting beam. For example, an SIB that is transmitted using transmitting beam #1 of the serving cell includes the CSI-RS configurations of the CSI-RS beams of nearby cells X and Y associated with that transmitting beam. According to this option A-4, the amount of information of SIBs can be reduced compared to options A-3 and A-3a.

Second Embodiment

In a second embodiment of the present invention, 1 common signaling (for example, a certain SIB) is used to communicate CSI-RS configurations to the serving cell and nearby cells (option B).

For common signaling (for example, SIB) for CSI-RS configuration for the serving cell and nearby cells, there may be the following options of B-1, B-2, B-3 and B-4.

SIBs according to option B-1 use option A-1 for CSI-RS configurations for the serving cell and use option A-3 for CSI-RS configurations for nearby cells. Different SIBs carry common contents.

SIBs according to option B-2 use option A-1 for CSI-RS configurations for the serving cell and use option A-4 for CSI-RS configurations for nearby cells. The contents of CSI-RS configurations for the serving cell are common among different SIBs. The contents of CSI-RS configurations for nearby cell vary among different SIBs.

SIBs according to option B-3 use option A-2 for CSI-RS configurations for the serving cell and use option A-3 for CSI-RS configurations for nearby cells. The contents of CSI-RS configurations for the serving cell vary among different SIBs. The contents of CSI-RS configurations for nearby cells are common among different SIBs.

SIBs according to option B-4 use option A-2 for CSI-RS configurations for the serving cell and use option A-4 for CSI-RS configurations for nearby cells. Different SIBs carry different contents.

Note that, in options B-1, B-2, B-3 and B-4, option A-1a may be used for CSI-RS configurations for the serving cell, and option A-3a may be used for CSI-RS configurations for nearby cells.

According to the second embodiment described above, 1 SIB includes common resource configuration information for the serving cell and common resource information for nearby cells, so that it is possible to avoid reporting CSI-RS configurations on a per UE basis, and reduce the overhead of reporting CSI-RS configurations.

Third Embodiment

In a third embodiment of the present invention, 1 common signaling (for example, a certain SIB) is used to communicate CSI-RS configurations to the serving cell, and, to nearby cells, CSI-RS configurations are reported by using UE-specific RRC signaling (option C).

For common signaling (for example, SIB) for CSI-RS configurations for the serving cell and nearby cells, there may be the following options of C-1 and C-2.

Option C-1 uses the common signaling of option A-1 for CSI-RS configurations for the serving cell, and uses individual RRC signaling for CSI-RS configurations for nearby cells.

Option C-2 uses the common signaling of option A-2 for CSI-RS configurations for the serving cell, and uses individual RRC signaling for CSI-RS configurations for nearby cells.

In the event options C-1 and C-2 are used, the individual RRC signaling for CSI-RS configurations for nearby cells may be selected based on measurement reports from UE (for example, detected SS blocks of nearby cells).

Figure 7:
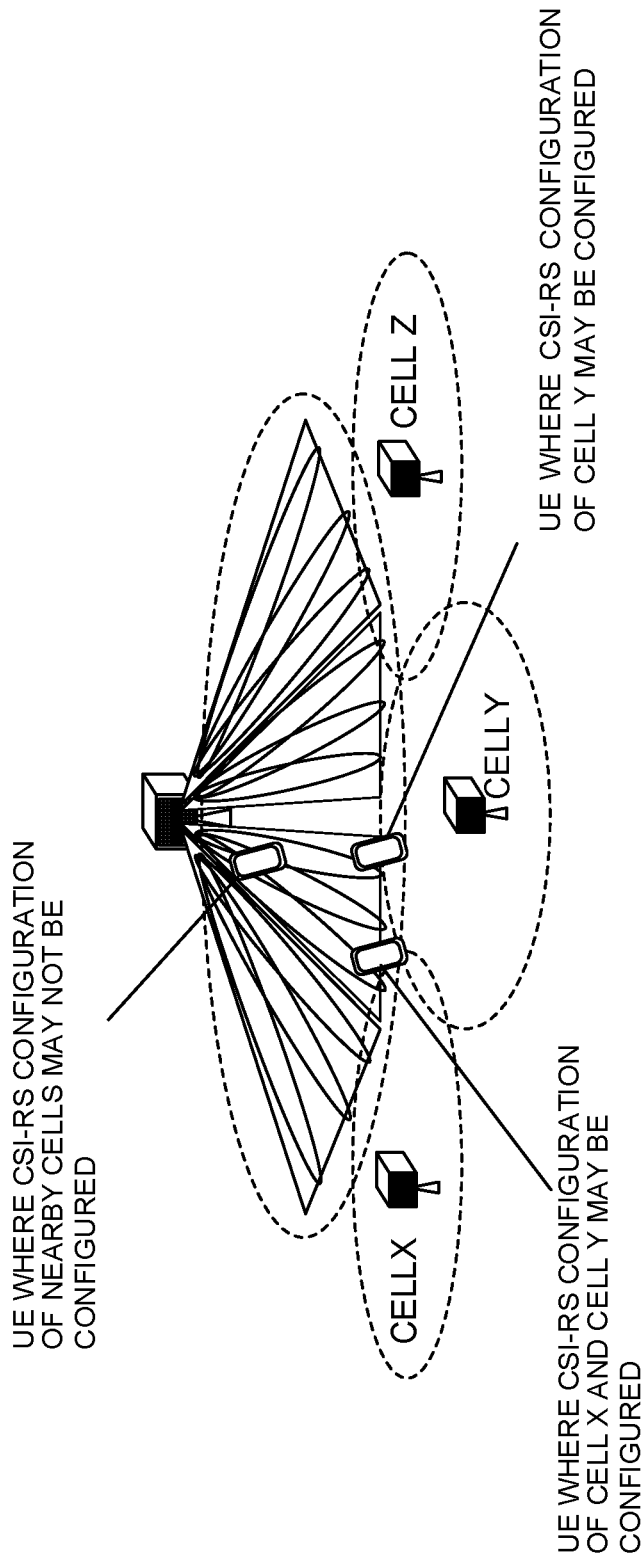
FIG. 7 is a diagram to show an example scenario of option C-2.

FIG. 7 is a diagram to show an example scenario of option C-2. In this example, UEs #0, #1 and #2 are located in the area of transmitting beam #1 for the serving cell. Since UE #0 is located near the boundaries of the serving cell, cell X and cell Y, UE #0 reports the measurement results of cells X and Y. By this means, CSI-RS configurations for cells X and Y as nearby cells are configured in UE #0 by using individual RRC signaling. Since UE #1 is located near the center of the serving cell, UE #1 does not report the measurement results of nearby cells.

By this means, UE #1 is not configured with the CSI-RS configuration for the nearby cell. Since UE #2 is located near the boundaries of the serving cell and cell Y, UE #2 reports the measurement results of cell Y. By this means, CSI-RS configurations for cell Y as a nearby cell are configured in UE #0 by using individual RRC signaling.

According to the third embodiment described above, common signaling is used for CSI-RS configurations for the serving cell, the overhead of report in CSI-RS configurations can be reduced. Since the possibility of receiving CSI-RS beams from nearby cell varies depending on where in the serving cell UE is located, CSI-RS configurations for nearby cells can be reported on a per UE basis. Also, by selecting CSI-RS configurations based on measurement reports from the UE, adequate CSI-RS configurations of nearby cells can be reported.

<Variations>

In all of the options described above, UE-specific RRC signaling may update some of the parameters for CSI-RS resource configurations for the serving cell and/or nearby cells, or limit the CSI-RSs to measure, based on CSI-RS RRM measurement configurations that are common within SIBs.

In the event options A-2 and A-4 (option 2) are used, UE group (beam-specific)-common SIB transmission, which carries CSI-RS configurations for the serving cell and/or nearby cells, may be requested from UE—that is, may be transmitted on-demand.

Which option is employed may be defined in the specification per frequency range or frequency band, or may be signaled from the NW.

The association between CSI-RS configurations and SS blocks and/or the cell IDs of nearby cells may be represented by information about QCL (Quasi-Co-Location).

Note that an SIB does not have to include CSI-RS configurations. An SIB may be interpreted as another broadcast channel (that contains, for example, RMSI (Remaining Minimum System Information)), or a specific channel such as NR-PDSCH for communicating SIBs. That is, specific channels that are transmitted using different transmitting beams may carry common contents, or specific channels that are transmitted using different transmitting beams may carry different contents. Also, when UE receives an SS block that is transmitted using different transmitting beams (or a set of transmitting beams), the UE may, depending on the movement, reread the contents of a particular channel transmitted using that transmitting beam.

(Radio Communication System)

Now, the structure of a radio communication system according to one embodiment of the present invention will be described below. In this radio communication system, communication is performed using 1 of the radio communication methods according to the herein-contained embodiments of the present invention, or a combination of these.

Figure 8:
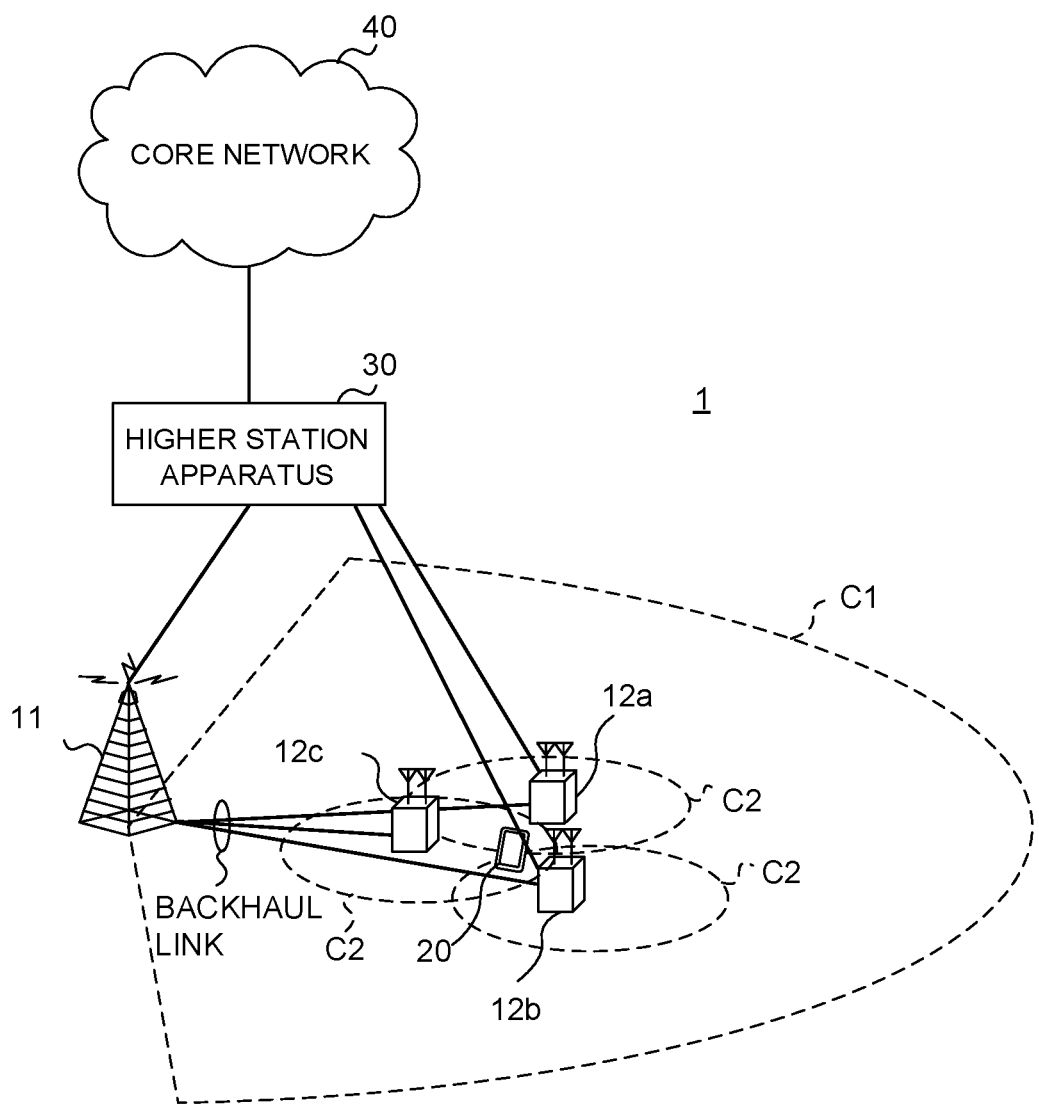
FIG. 8 is a diagram to show an exemplary schematic structure of a radio communication system according to one embodiment of the present invention.

FIG. 8 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement, number and so on of cells and user terminals are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, 5 or fewer CCs or 6 or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with 1 or continuous resource blocks per terminal, and allowing a number of terminals to use mutually different bands. Note that, uplink and downlink radio access schemes are not limited to these combinations, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, is communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

(Radio Base Station)

Figure 9:
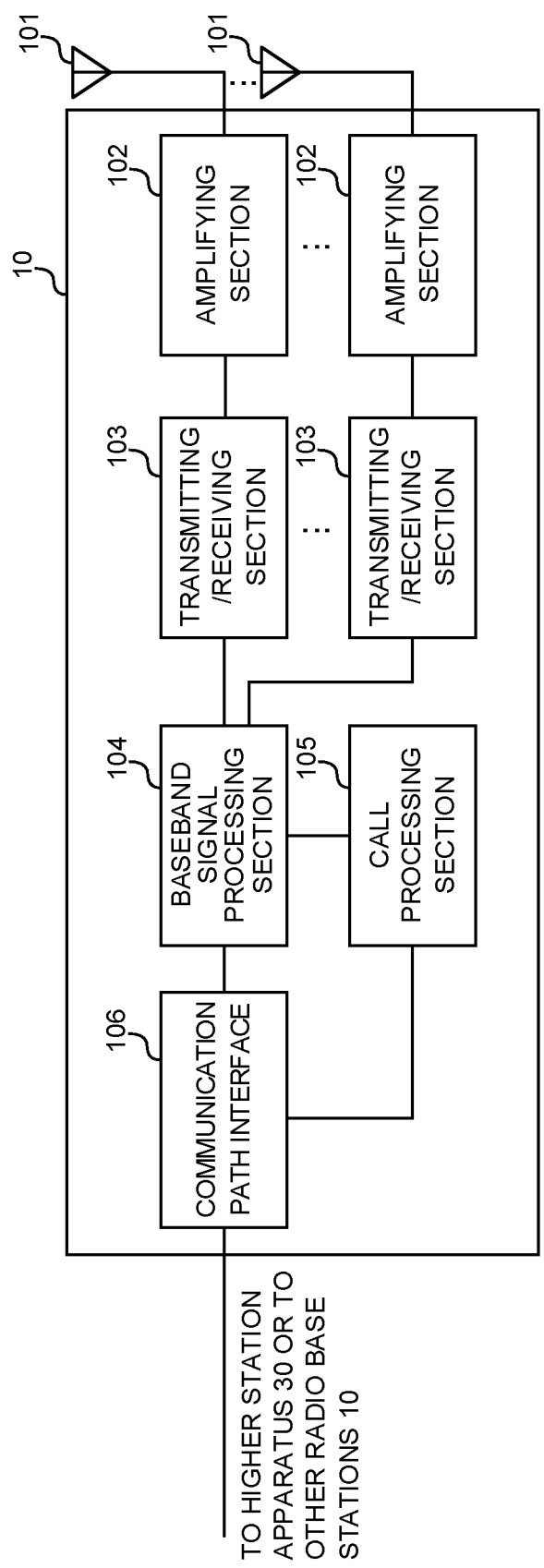
FIG. 9 is a diagram to show an exemplary overall structure of a radio base station according to one embodiment of the present invention.

FIG. 9 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106.

Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Also, the transmitting/receiving sections 103 may transmit common information (for example, an SIB), which shows parameters (for example, common resource configuration information) that apply in common to a number of space resources (for example, CSI-RS beams) that are used to transmit a reference signal (for example, CSI-RS).

Also, the transmitting/receiving sections 103 may transmit a synchronization signal (for example, an SS block) that is transmitted using space resources for synchronization (for example, transmitting beams), associated with multiple space resources (for example, CSI-RS beams).

Figure 10:
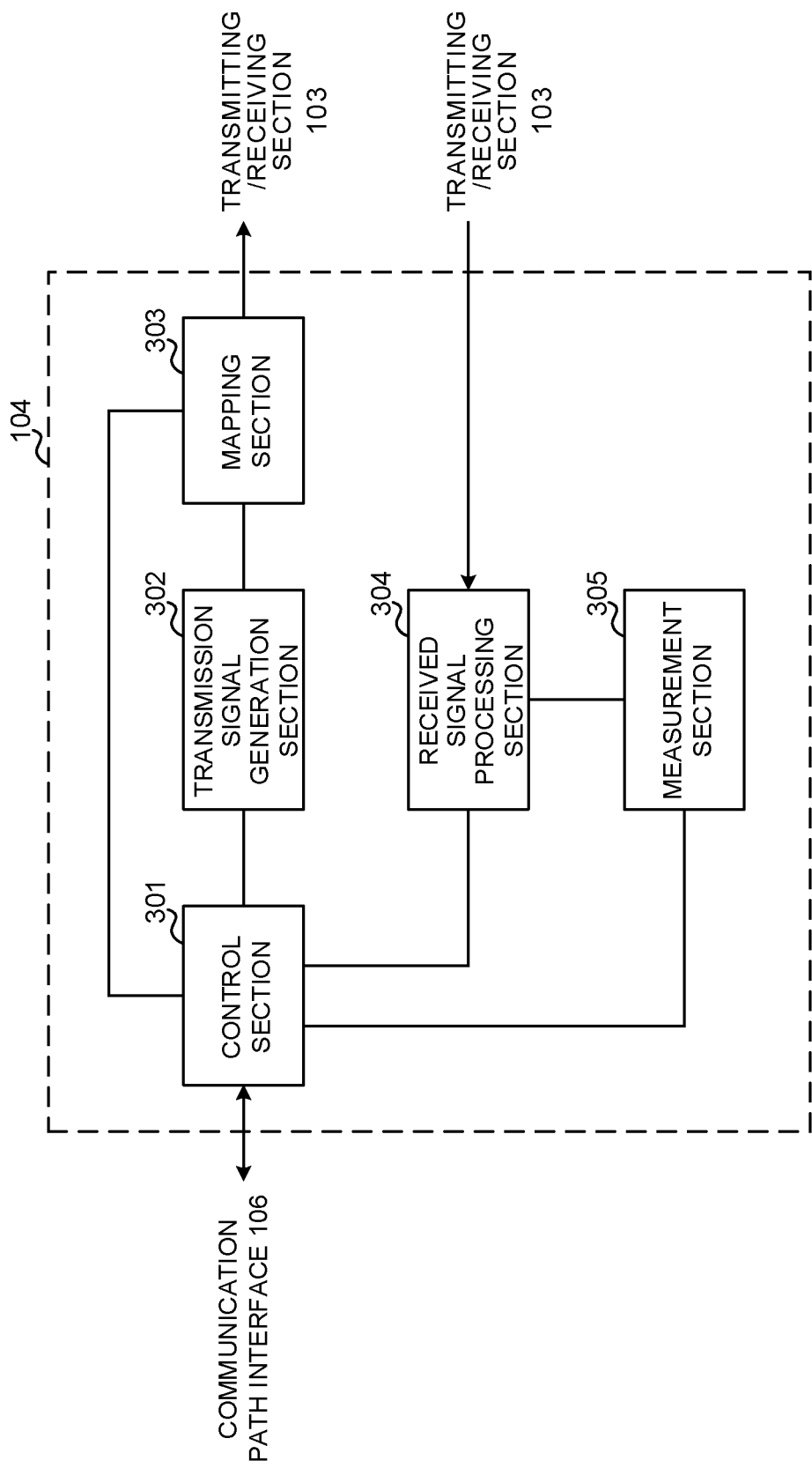
FIG. 10 is a diagram to show an exemplary functional structure of a radio base station according to one embodiment of the present invention.

FIG. 10 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals communicated in the PDSCH and/or the EPDCCH). Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

The control section 301 controls scheduling such as uplink data signal (for example, signal transmitted on PUSCH, uplink control signals (for example, signals transmitted on PUCCH and/or PUSCH, including delivery acknowledgment information of delivery dependency, etc.), random access preamble (for example, a signal transmitted on PRACH) and uplink reference signal.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI), and so on. The measurement results may be output to the control section 301.

The control section 301 may also select individual signaling (for example, RRC signaling) based on measurement reports from the user terminal 20. ↑For example the control section 301 may also select individual RRC signaling for nearby cells' CSI-RS configurations, based on measurement reports from the user terminal 20.

(User Terminal)

Figure 11:
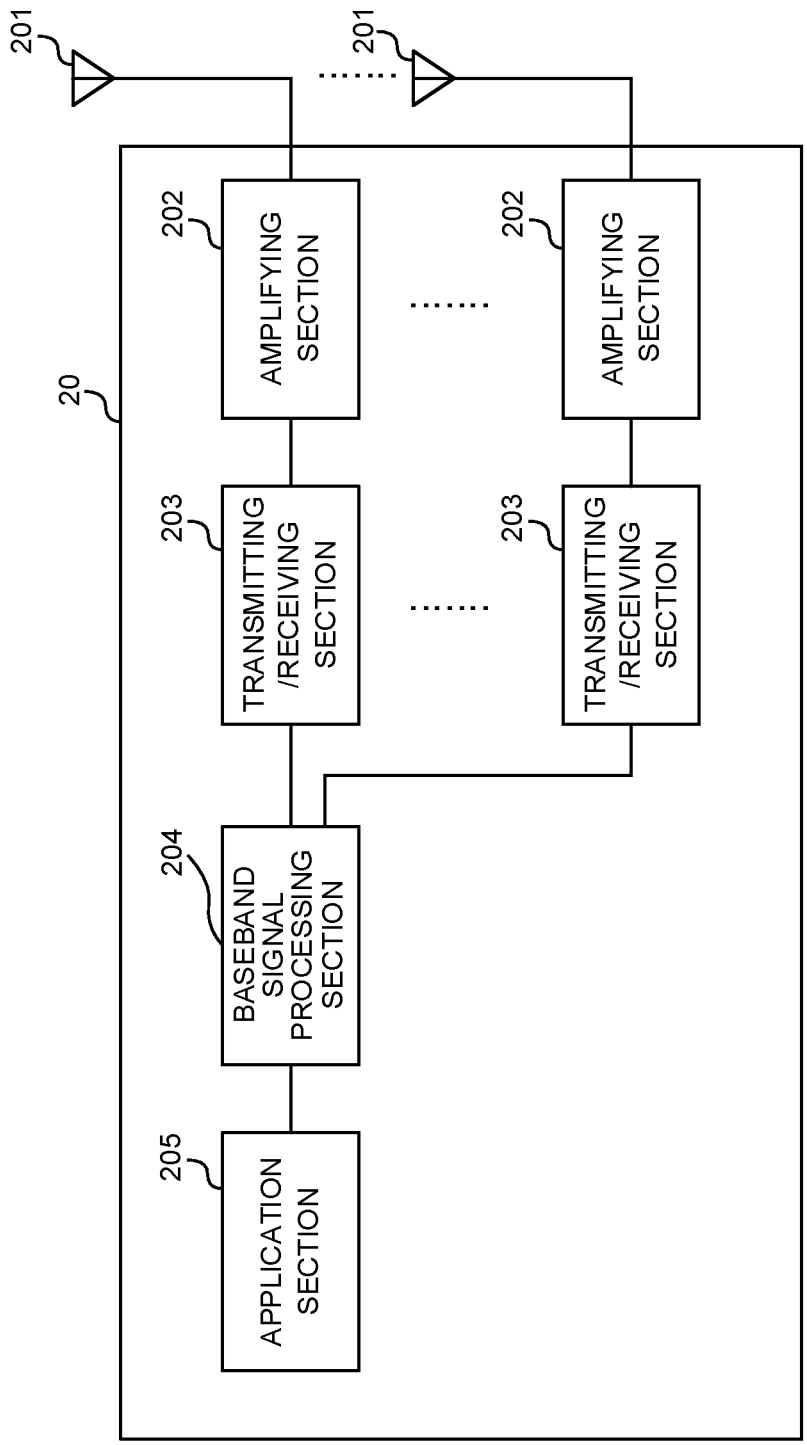
FIG. 11 is a diagram to show an exemplary overall structure of a user terminal according to one embodiment of the present invention.

FIG. 11 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 may receive common information (for example, an SIB), which shows parameters (for example, common resource configuration information) that apply in common to a number of space resources (for example, CSI-RS beams) that are used to transmit a reference signal (for example, CSI-RS).

Also, the transmitting/receiving sections 203 may receive a synchronization signal (for example, an SS block) that is transmitted using space resources for synchronization (for example, transmitting beams), associated with multiple space resources (for example, CSI-RS beams).

Also, the transmitting/receiving sections 203 may receive common information, which shows parameters that apply in common to a plurality of space resources that are used to transmit a reference signal for the serving cell, and receive specific information that shows the parameters of reference signals for nearby cells.

Figure 12:
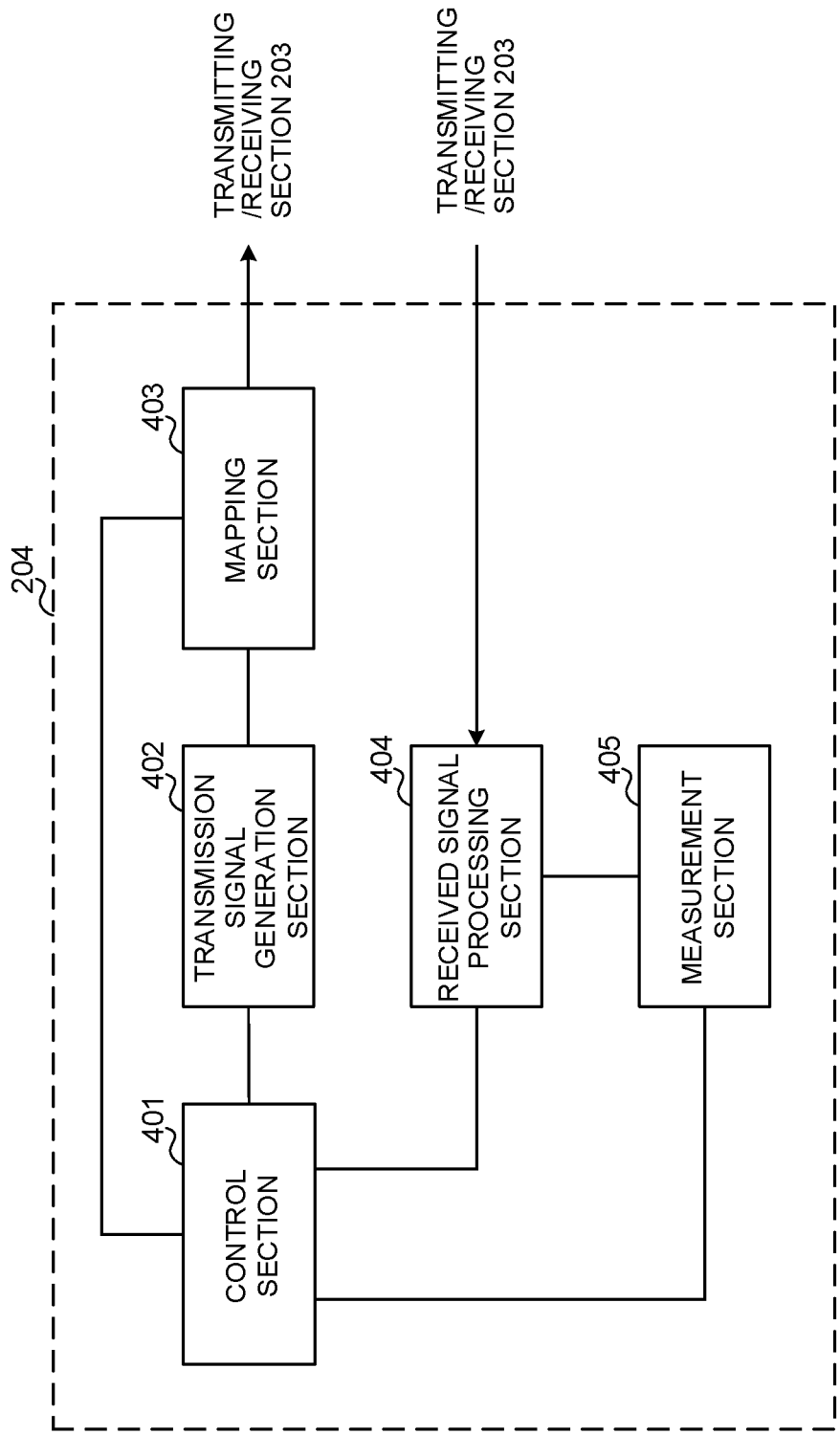
FIG. 12 is a diagram to show an exemplary functional structure of a user terminal according to one embodiment of the present invention.

FIG. 12 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

The control section 401 may also control measurement of a reference signal transmitted using any of a plurality of space resources based on common information.

Also, common information may be transmitted using space resources for synchronization. The control section 401 may also control measurement of a reference signal transmitted using space resources associated with the space resources for synchronization, based on common information.

Also, the common information may show associations between a plurality of space resources for synchronization and a plurality of space resources, and may be transmitted using each of the plurality of space resources for synchronization (option 1).

Also, the common information may be one of a plurality of pieces of common information that are transmitted using a plurality of space resources for synchronization. These pieces of common information might show parameters that apply in common to a plurality of space resources associated with corresponding space resources for synchronization.

Furthermore, the common information may show the association of a plurality of groups of space resources for synchronization (for example, a group of transmitting beams used to transmit SS bursts) with a plurality of space resources, and may be transmitted using each of the plurality of groups.

Furthermore, common information may show parameters that apply in common to a plurality of space resources that are used to transmit reference signals for nearby cells (options A and B).

Also, first common information may show parameters that apply in common to a plurality of space resources that are used to transmit reference signals for the serving cell, and second common information may show parameters that apply in common to a plurality of space resources that are used to transmit reference signals for nearby cells (option A). Furthermore, common information may be provided that shows parameters that apply in common to a plurality of space resources that are used to transmit reference signals for the serving cell, and parameters that apply in common to a plurality of space resources that are used to transmit reference signals for nearby cells (option B).

Furthermore, common information may show parameters that apply in common to a plurality of space resources that are used to transmit reference signals for the serving cell, and show the parameters of reference signals for nearby cells (option C).

Also, the common information may show associations among parameters that apply in common to a plurality of space resources that are used to transmit reference signals for nearby cells, the cell IDs of nearby cells, and the space resources for synchronization for nearby cells (options A-3, A-3a and A-4). Also, the common information may show associations among parameters that apply in common to a plurality of space resources that are used to transmit reference signals for nearby cells, and space resources for synchronization for the serving cell (options A-3 and A-3a). Furthermore, the common information may show parameters that apply in common to a plurality of space resources that are used to transmit reference signals for nearby cells, and may be one of a plurality of pieces of common information that are transmitted using a plurality of space resources for synchronization for the serving cell.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 13:
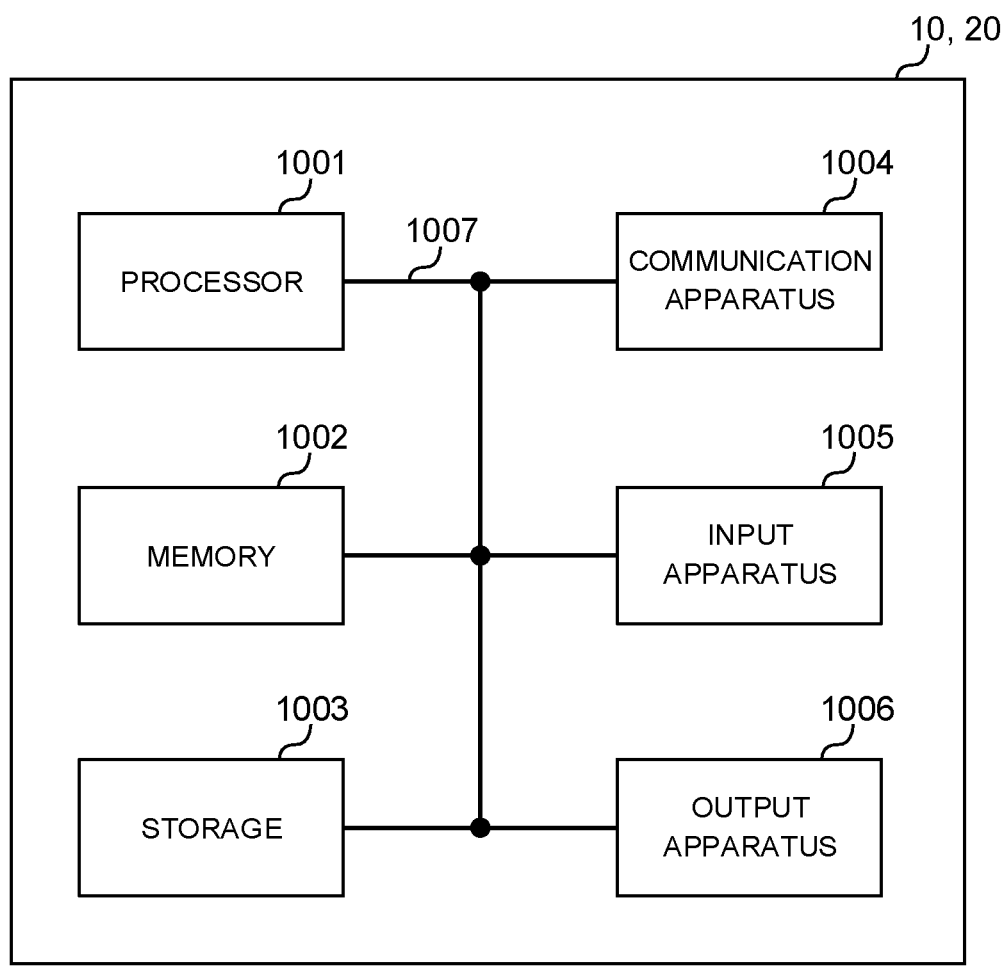
FIG. 13 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 13 is a diagram to show an exemplary hardware structure of a radio base station and a user terminal according to one embodiment of the present invention.

Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that communicate the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when 1 slot or 1 minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," a "mini-slot," a "sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are merely examples. For example, configurations pertaining to the number of subframes included in a radio frame, the number of slots included per subframe or radio frame, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented using other applicable information. For example, a radio resource may be specified by a predetermined index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent in an implicit way (for example, by not reporting this piece of information, by reporting another piece of information, and so on).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination of these. For example, "connection" may be interpreted as "access."

As used herein, when 2 elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal, comprising:
   a receiver that receives common information that represents a parameter that is common among a plurality of space resources that are used to transmit a reference signal; and
   a processor that controls measurement of the reference signal, which is transmitted using one of the plurality of space resources, based on the common information,
   wherein the receiver receives a synchronization signal, which is transmitted using a synchronization space resource associated with the plurality of space resources,
   wherein the common information is transmitted using the synchronization space resource,
   wherein the processor controls measurement of the reference signal, which is transmitted using a space resource associated with the synchronization space resource, based on the common information, and
   wherein the common information shows associations between a plurality of synchronization space resources and the plurality of space resources, and the common information is transmitted using each of the plurality of synchronization space resources.

2. The terminal according to claim 1, wherein the common information represents a parameter that is common among a plurality of space resources that are used to transmit reference signals of nearby cells.

3. A radio communication method for a terminal, comprising the steps of:
   receiving common information that represents a parameter that is common among a plurality of space resources that are used to transmit a reference signal; and
   controlling measurement of the reference signal, which is transmitted using one of the plurality of space resources, based on the common information,
   wherein the terminal receives a synchronization signal, which is transmitted using a synchronization space resource associated with the plurality of space resources,
   wherein the common information is transmitted using the synchronization space resource,
   wherein the terminal controls measurement of the reference signal, which is transmitted using a space resource associated with the synchronization space resource, based on the common information, and
   wherein the common information shows associations between a plurality of synchronization space resources and the plurality of space resources, and the common information is transmitted using each of the plurality of synchronization space resources.

* * * * *